(12) United States Patent
Gendron et al.

(10) Patent No.: US 8,376,280 B1
(45) Date of Patent: Feb. 19, 2013

(54) AERODYNAMIC DEFLECTOR SHIELD FOR PROTECTION OF OPTICAL DEVICES MOUNTED ON FIXED-WING AIRCRAFT

(75) Inventors: Peter Q. Gendron, Merrimack, NH (US); Christopher L. Chew, Litchfield, NH (US); Michael R. Mendenhall, Los Gatos, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 462 days.

(21) Appl. No.: 12/349,982

(22) Filed: Jan. 7, 2009

Related U.S. Application Data

(60) Provisional application No. 61/010,429, filed on Jan. 7, 2008.

(51) Int. Cl.
*B64C 1/38* (2006.01)

(52) U.S. Cl. ............... 244/130; 244/129.1; 244/1 R; 250/239

(58) Field of Classification Search ............... 244/130, 244/129.1, 1 R; 250/239
See application file for complete search history.

(56) References Cited

U.S. PATENT DOCUMENTS

| | | | | |
|---|---|---|---|---|
| 3,978,342 A | * | 8/1976 | Hagen et al. | 250/495.1 |
| 2007/0075182 A1 | * | 4/2007 | Fetterly | 244/3.16 |

* cited by examiner

*Primary Examiner* — J. Woodrow Eldred
(74) *Attorney, Agent, or Firm* — Robert K. Tendler; Daniel J. Long

(57) ABSTRACT

In a method for operating an infrared countermeasure optical device on an aircraft, the improvement comprises the steps of positioning a deflector upstream from the optical device to allow said optical device to operate in high-speed freestream flows.

7 Claims, 1 Drawing Sheet

AERODYNAMIC DEFLECTOR SHIELD FOR PROTECTION OF OPTICAL DEVICES MOUNTED ON FIXED-WING AIRCRAFT

CROSS-REFERENCE TO RELATED APPLICATION

This application claims rights under 35 U.S.C.§119(e) from U.S. Application Ser. No. 61/010,429 filed Jan. 7, 2008.

STATEMENT OF GOVERNMENT INTEREST

This invention was made with United States Government support under Contract No. HSSCHQ-04-C-00342 awarded by the Department of Homeland Security. The United States Government has certain rights in this invention.

BACKGROUND OF THE INVENTION

1. Field of the Invention

The present invention relates to infrared countermeasures for use on aircraft and more particularly to means for limiting loads on optical devices used in such infrared countermeasures.

2. Brief Description of Prior Developments

Infrared countermeasure optical devices are conventionally positioned on aircraft. A need exists for a way to protect infrared countermeasure optical devices from high-speed airflow in order to maintain low torques on the rotating head of the device, lower drag load on the optical device, and limit foreign object damage to the optical device. This protection must not degrade performance of the optical device due to additional physical blockage of lines of sight.

SUMMARY OF INVENTION

According to the present invention, a deflector diverts airstream away from the infrared countermeasure optical device while minimizing drag increase to the airframe. This results in very low torques on the optical device, allowing it to operate in high-speed freestream flows without stalling motors. Also, the deflector provides significant FOD protection and does not add any additional blockage to the field of view beyond what is blocked by the aircraft fuselage.

BRIEF DESCRIPTION OF THE DRAWINGS

The present invention is further described with reference to the accompanying drawings wherein.

DETAILED DESCRIPTION OF THE PREFERRED EMBODIMENT

Figure 2:
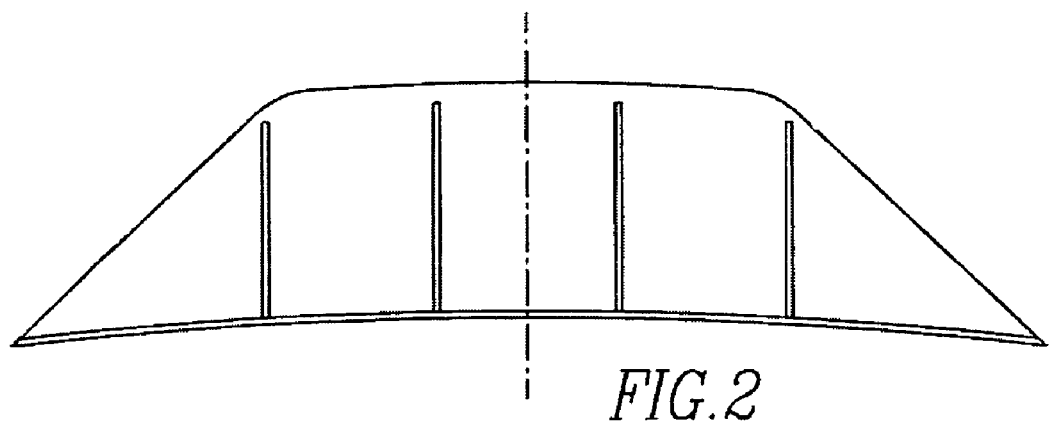

Optic devices with rotating heads produce bluff bodies in the airstream that are sensitive to high-speed airflow due to high aerodynamic torques, FOD susceptibility, and high drag loads. To protect and shield these optic devices, a deflector was developed consisting of a contoured plate swept aft and mounted upstream of the optic device. The width, height, and sweep angle of the deflector were selected using advanced viscous computational fluid dynamics methods to assure the high-speed airstream was diverted from the optic device (jamhead) for all flight conditions. Designed for subsonic operation, the upstream airflow reacts to the deflector diverting flow outboard of the optical device, resulting in low torque on the optic device rotating azimuth and elevation heads. The deflector interface drawings are shown in FIG. 2 outlining the profile and the mounting location relative to the optical device (PTH). The resulting design is a low cost method that shields the optic device from high aerodynamic torques and also provide FOD protection for sensitive optics.

The deflector profile and upstream location relative to the jamhead were derived to assure the high-speed flow that would normally impinge on the jamhead would be diverted over the jamhead. The height of deflector was limited to assure no additional blockage of the laser port beyond what was blocked by the aircraft fuselage. As a result, the jamhead is operating in the wake of the deflector and therefore has very low dynamic pressure and low torque and drag loads.

Wind tunnel testing of a production operational optical device was completed verifying operation and integrity at speeds up to 300 knots. This testing verified that the optical device with a deflector mounted upstream has the capability to accurately point and track over various required flight envelopes including speeds up to 300 KCAS. The point and track capability was derived by the Optical Device maintaining allowable motor current and temperature limits for safe operation.

Figure 1:
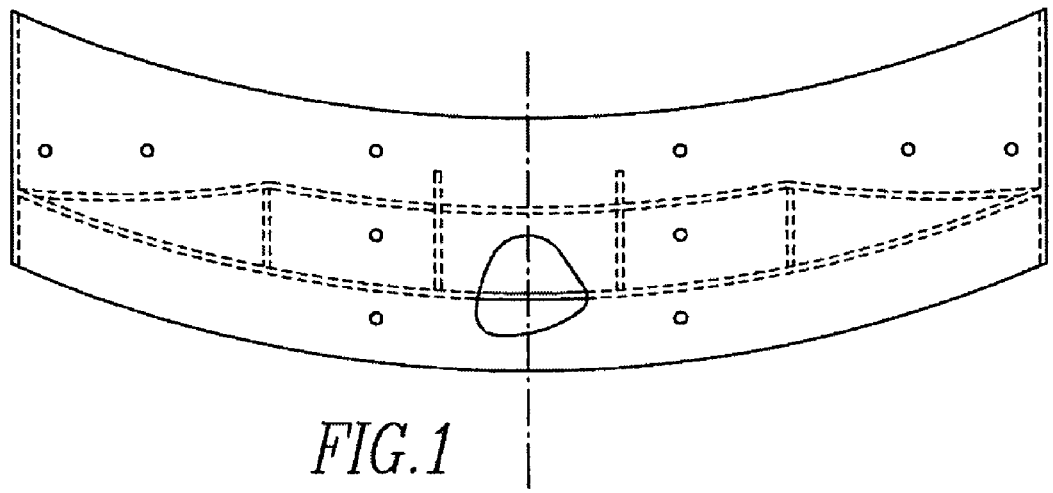
FIGS. 1 and 2 are various views of a preferred embodiment of the deflector of the present invention.

Referring to FIG. 1, the deflector includes a base surface 10 and a plurality of vertical ribs as at 12, 14, 16 and 18. There is also an angular front surface as at 20.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method adapted to be used with a conventional exposed jam head optical device adapted to be mounted to an aircraft, the optical device including an at least partially transparent housing, a laser modulated to provide jamming radiation and rotating optics to direct the modulated laser radiation to a target, the rotating optics drive by motors, wherein the improvement comprises the steps of:

Positioning the conventional exposed jam head in an airflow; and

Positioning a separate windscreen type deflector in said airflow upstream and only upstream of said jam head and spaced from and ahead of said jam head to prevent erosion of or damage to the jam head, said deflector including a contoured plate swept aft and mounted upstream of said jam head, said deflector having a sweep angle selected to assure high speed airstream diversion from said jam head such that airflow is diverted outboard of said jam head to substantially divert said airflow away from said jam head for permitting unimpeded rotation of said jam head laser pointing optics and to reduce drag loads caused by said jam head, thereby allowing said jam head to point and track in high-speed freestream flows.

2. The method of claim 1, wherein said windscreen type deflector is further positioned to avoid a blockage of the field of view of said jam head.

3. The method of claim 1, wherein there is at least one foreign object in said airflow and further including the step of deflecting at least said one foreign object from said jam head.

4. An apparatus adapted to be used with a conventional exposed jam head adapted to be located on an aircraft, comprising:

A conventional exposed jam head optical device including an at least partially transparent housing, a laser modulated to provide jamming radiation and optics to direct the modulated laser radiation to a target, said jam head adapted to be positioned in an airflow; and A separate widescreen type of deflector spaced from and positioned upstream and only upstream of said jam head and angled to substantially divert said airflow away from said jam head optical device for preventing erosion of or damage to said jam head and to reduce drag loads caused by the location of said jam head on an aircraft, thereby allowing said conventional jam head to operate in high-speed freestream flows.

5. The apparatus of claim 4, wherein said an airflow includes at least one foreign object and wherein said widescreen type deflector is further positioned to deflect said at least one foreign object away from said jam head.

6. The apparatus of claim 4, wherein said windscreen type deflector is further configured in height and position so as to avoid a blockage of a field of view of said jam head.

7. The apparatus of claim 4, wherein said windscreen type deflector includes reinforcing ribs spaced across said widescreen type deflector.

* * * * *